United States Patent
Oh et al.

(10) Patent No.: US 9,851,213 B2
(45) Date of Patent: Dec. 26, 2017

(54) SYSTEM AND METHOD FOR RECOMMENDING CHARGING STATION FOR ELECTRIC VEHICLE

(71) Applicant: I-ON COMMUNICATIONS CO., LTD., Seoul (KR)

(72) Inventors: Jae Cheol Oh, Seoul (KR); Kyoung Seok Paik, Seoul (KR)

(73) Assignee: I-ON Communications Co., Ltd., Seoul (KR)

( * ) Notice: Subject to any disclaimer, the term of this patent is extended or adjusted under 35 U.S.C. 154(b) by 0 days.

(21) Appl. No.: 15/383,918

(22) Filed: Dec. 19, 2016

(65) Prior Publication Data
US 2017/0276503 A1    Sep. 28, 2017

(30) Foreign Application Priority Data
Mar. 23, 2016    (KR) .................. 10-2016-0034758

(51) Int. Cl.
*B60L 11/18*    (2006.01)
*G01C 21/34*    (2006.01)

(52) U.S. Cl.
CPC ...... *G01C 21/3469* (2013.01); *B60L 11/1824* (2013.01); *B60L 11/1861* (2013.01); *B60L 2230/16* (2013.01)

(58) Field of Classification Search
CPC .... G01C 21/34; B60L 11/138; B60L 11/1851; B60L 11/1838
See application file for complete search history.

(56) References Cited

U.S. PATENT DOCUMENTS 8,970,341 B2    3/2015    Park et al.
9,348,381 B2 *  5/2016    Khoo .................. B60L 11/1825
(Continued)

FOREIGN PATENT DOCUMENTS

CN    105109357 A    12/2015
EP    2792538 A2    10/2014
(Continued)

OTHER PUBLICATIONS

Korean Patent Application No. 10-2016-0034758; Notice of Preliminary Rejection dated Sep. 12, 2016, 10 pages.
(Continued)

*Primary Examiner* — Yonel Beaulieu
*Assistant Examiner* — Martin Weeks
(74) *Attorney, Agent, or Firm* — Lathrop Gage LLP

(57) ABSTRACT

The present disclosure relates to a big data-based method or system for recommending electric vehicle (EV) charging stations with the shortest charge waiting time, which comprises a driving information receiving unit for receiving a charging station search request, and information about estimated discharge time and a current location from an electric vehicle; a charging station information receiving unit for receiving power consumption data from charging stations in real time; a charge waiting time calculation unit for receiving the power consumption data from the charging station information receiving unit, and, in response to a charging station search request, calculating charge waiting time of the charging stations on the basis of their power consumption; and an optimal charging station providing unit for receiving the information about the estimated discharge time and current location from the driving information receiving unit, and receiving the charge waiting time from the charge waiting time calculation unit, and providing information about at least one optimal charging station that can reached
(Continued)

within the estimated discharge time based on the current location and can recharge the vehicle in the shortest time.

4 Claims, 3 Drawing Sheets

(56) References Cited

U.S. PATENT DOCUMENTS

| | | | |
|---|---|---|---|
| 2012/0109798 A1* | 5/2012 | Shelton | B60L 3/0069 705/34 |
| 2012/0191242 A1* | 7/2012 | Outwater | G06Q 30/06 700/236 |
| 2013/0226441 A1* | 8/2013 | Horita | B60Q 9/00 701/118 |
| 2013/0261953 A1 | 10/2013 | Kiyama et al. | |
| 2014/0129139 A1* | 5/2014 | Ellison | G01C 21/3469 701/533 |
| 2014/0257884 A1* | 9/2014 | Kyoung | G06Q 10/02 705/5 |
| 2014/0316939 A1 | 10/2014 | Uyeki | |
| 2015/0198459 A1 | 7/2015 | Macneille et al. | |
| 2015/0226566 A1 | 8/2015 | North et al. | |
| 2015/0298565 A1* | 10/2015 | Iwamura | B60L 11/1844 701/22 |

FOREIGN PATENT DOCUMENTS

| | | |
|---|---|---|
| EP | 2887016 A1 | 6/2015 |
| KR | 10-2011-0114027 A | 10/2011 |
| KR | 10-2012-0116162 A | 10/2012 |
| KR | 10-2013-0013012 A | 2/2013 |
| KR | 20130094919 A | 8/2013 |
| KR | 20140110291 A | 9/2014 |

OTHER PUBLICATIONS

Examination Report corresponding to Australian Patent Application No. 2016269540, dated Apr. 24, 2017.

Search Report corresponding to United Kingdom Patent Application No. GB1622175.6, dated Mar. 28, 2017.

* cited by examiner

SYSTEM AND METHOD FOR RECOMMENDING CHARGING STATION FOR ELECTRIC VEHICLE

RELATED APPLICATIONS

This application claims priority to Korean Patent Application No. 10-2016-0034758 filed on Mar. 23, 2016, the content of which is herein incorporated by reference in its entirety.

TECHNICAL FIELD

The present invention relates to an electric vehicle (EV) charging station recommendation system and method, and more particularly, a system and a method for recommending a charging station having the shortest charge waiting time based on big data.

BACKGROUND

The electric vehicle industry is rapidly growing. As the market share of electric vehicles increases, the charging infrastructure therefor is also expected to grow dramatically. The electric vehicle is equipped with a built-in battery that is charged with electricity, and an electric motor driven by the electricity charged in the battery. Although battery efficiency has improved alongside the development of a related technology, the fact that the battery needs to be charged, and that it takes a significant amount of time to charge the battery will remain the same for the time being.

Therefore, for smooth and efficient operation of the electric vehicle, the vehicle needs to be able to reach a charging station before the discharge of its battery, and also be able to be recharged in a short time without significant waiting time at the charging station. Consequently, in addition to the locations of nearby charging stations, the waiting time for charging at the charging stations is an important factor to the driver of the vehicle in selecting an optimal charging station.

The related technology is disclosed in KR 10-2012-0116162 A (published on Oct. 22, 2012).

SUMMARY

The present invention provides a system and a method for recommending a charging station with the shortest charge waiting time based on the power consumption of the charging station. The present invention also provides a system and a method that can improve the accuracy of the calculation of the charge waiting time by utilizing big data.

The present invention is not limited to those mentioned above, and other aspects of the present invention could be clearly understood by those skilled in the art from the following description.

An electric vehicle charging station recommendation system according to an embodiment of the present invention comprises: a driving information receiving unit for receiving a charging station search request, and information about estimated discharge time and a current location from an electric vehicle; a charging station information receiving unit for receiving power consumption data from charging stations in real time; a charge waiting time calculation unit for receiving the power consumption data from the charging station information receiving unit, and, in response to a charging station search request, calculating charge waiting time of the charging stations on the basis of their power consumption; and an optimal charging station providing unit for receiving the information about the estimated discharge time and current location from the driving information receiving unit, and receiving the charge waiting time from the charge waiting time calculation unit, and providing information about at least one optimal charging station that can be reached within the estimated discharge time based on the current location and that can recharge the vehicle in the shortest time.

According to an embodiment, the optimal charging station providing unit determines nearby charging stations reachable within the estimated discharge time, and provides information on at least one optimal charging station having relatively short charge waiting time, selected among the nearby charging stations.

According to an embodiment, the optimal charging station providing unit determines the nearby charging stations reachable within the estimated discharge time, calculates the minimum charge time, which is the sum of travel time to a respective charging station and the charge waiting time at said charging station, and provides information about optimal charging stations in the order from shortest to longest in the minimum charge time.

According to an embodiment, the charge waiting time calculation unit stores in advance a set basic estimated charging time corresponding to each level of power consumption of a respective charging stall. If the power consumption data received from a charging station is the power consumption of the charging station ("charging station power consumption"), the basic estimated charge time corresponding to the value of the charging station power consumption divided by the number of charging stalls in the charging station is used as the charge waiting time at the charging station. However, if the power consumption data received from the charging station is the power consumption of a charging stall ("charging stall power consumption"), the basic estimated charge time corresponding to the charging stall power consumption is used as the charge waiting time.

According to an embodiment, the driving information receiving unit receives actual charge time from the electric vehicle recharged at the charging station, and the charge waiting time calculation unit receives and stores the charging station power consumption data during the actual charge time from the charging station information receiving unit, and reflects the actual power consumption and actual charge time t1 so as to improve the calculation accuracy of charge waiting time.

According to an embodiment, the charge waiting time calculation unit calculates the average of the charging station power consumption during the actual charge time, and the charge waiting time calculation unit adds the basic estimated charge time to the actual charge time and calculates the average thereof to generate a new estimated charge time ("updated estimated charge time"), thereby replacing the basic estimated charge time with the updated estimate charge time.

According to an embodiment, the charge waiting time calculation unit calculates maximum charging stall power consumption, which is the value of the maximum power consumption of the charging station divided by the number of charging stalls held in the charging station, wherein the quotient of the power consumption of the charging station divided by the maximum charging stall power consumption is subtracted from the total number of the charging stalls of the charging station, and the result of said operation is determined as the number of unused charging stalls. If the number of the unused charging stalls is greater than 1, the charge waiting time can be determined as zero.

According to an embodiment, the power consumption comprises the power consumption of each of the charging stalls installed in the charging station ("charging stall power consumption"), and the charge waiting time calculation unit calculates the charge waiting time of a charging station, which has one or more charging stalls with zero power consumption (C), as −C.

A method of recommending an electric vehicle charging station according to an embodiment of the present invention comprises the steps of: (a) transmitting a charging station search request, and information about estimated discharge time and a current location by an electric vehicle to a driving information receiving unit; (b) transmitting the information about the estimated discharge time and current location by the driving information receiving unit to an optimal charging station providing unit; (c) transmitting power consumption data by a power meter to a charging station information receiving unit in real time; (d) transmitting the power consumption data by the charging station information receiving unit to a charge waiting time calculation unit; (e) by a charge waiting time calculation unit, calculating the charge waiting time of charging stations on the basis of their power consumption; and transmitting the charge waiting time to the optimal charging station providing unit; and (f) by the optimal charging station providing unit, providing information about at least one optimal charging station that can be reached within the estimated discharge time based on the current location and that can recharge the vehicle in the shortest time.

According to an embodiment, step (f) comprises determining nearby charging stations that can be reached within the estimated discharge time, and providing information on at least one optimal charging station having relatively short charge waiting time, selected among the nearby charging stations.

According to an embodiment, step (f) comprises determining nearby charging stations that can be reached within the estimated discharge time, and providing information about optimal charging stations in the order from shortest to longest in the minimum charge time.

According to an embodiment, step (e) comprises storing in advance a set basic estimated charging time corresponding to each level of power consumption of a respective charging stall, wherein if the power consumption data received from a charging station is charging station power consumption, the basic estimated charge time corresponding to the value of the charging station power consumption divided by the number of charging stalls in the charging station is used as the charge waiting time at the charging station, and wherein if the power consumption data received from the charging station is charging stall power consumption, the basic estimated charge time corresponding to the charging stall power consumption is used as the charge waiting time.

According to an embodiment, the method of recommending an electric vehicle charging station further comprises: the driving information receiving unit receiving actual charge time from the electric vehicle recharged at the charging station, and transmitting the actual charge time to the charge waiting time calculation unit; the charging station information receiving unit transmitting the charging station power consumption data during the actual charge time to the charge waiting time calculation unit; and the charge waiting time calculation unit receiving and storing the charging station power consumption data during the actual charge time as well as the actual charge time, and reflecting the charging station power consumption during the actual charge time so as to improve the calculation accuracy of the charge waiting time.

According to an embodiment, the charge waiting time calculation unit calculates the average of the charging station power consumption during the actual charge time, and adds the basic estimated charge time corresponding to the average to the actual charge time to calculate the average thereof so as to generate updated estimated charge time, thereby replacing the basic estimated charge time with the updated estimate charge time.

According to the present invention, a system and a method for recommending electric vehicle charging stations with the shortest charge waiting time based on charging station power consumption can be provided, which can improve the accuracy of the charge waiting time by utilizing big data.

The advantages of the present invention are not limited to those mentioned above. Other effects and merits of the present invention would become apparent to those skilled in the art with reference to the following description.

DETAILED DESCRIPTION

Hereinafter, the embodiments of the present invention will be described in detail with reference to the accompanying drawings. In the following description of the present invention, a detailed description of related known functions and configurations will be omitted, if necessary, when it may rather make the subject matter of the present invention unclear.

Figure 1:
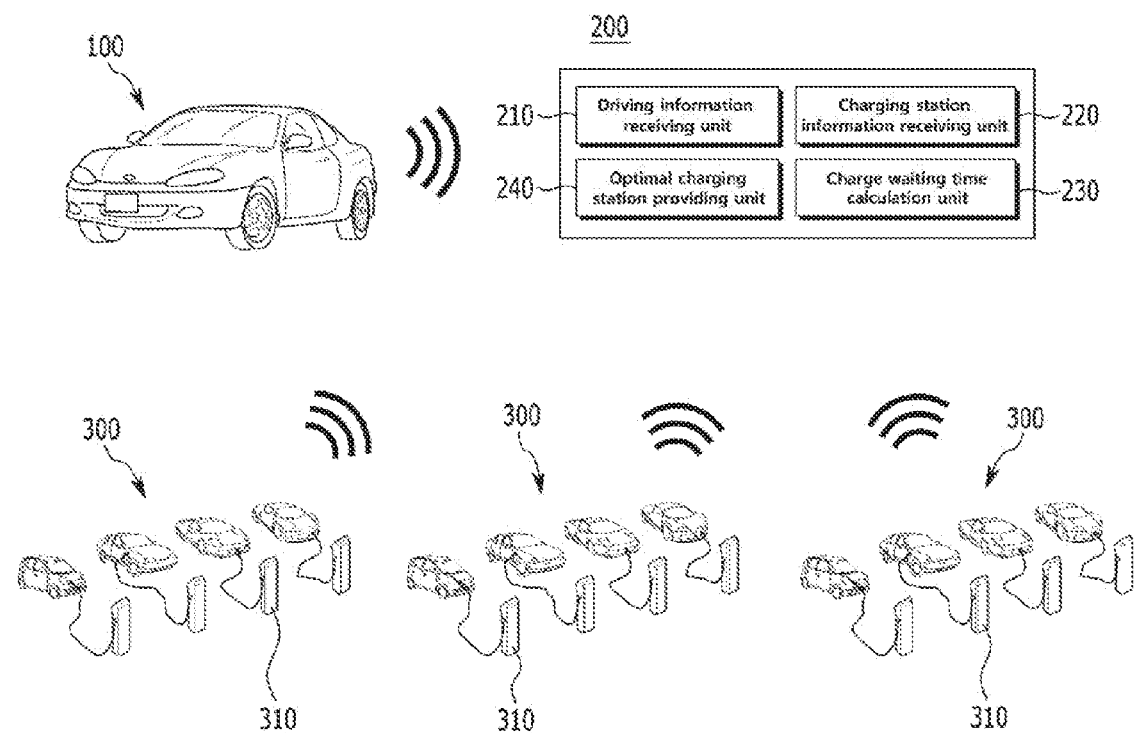
FIG. 1 is a schematic view showing a configuration in which an EV charging station recommendation system according to an embodiment of the present invention recommends an optimal charging station.
Figure 2:
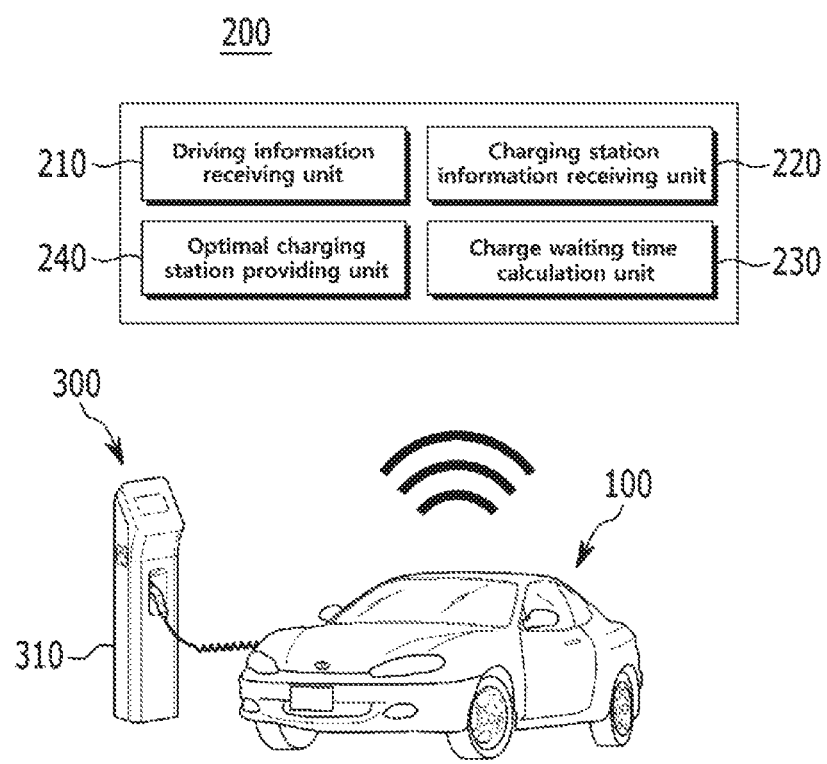
FIG. 2 is a schematic view showing a configuration in which an EV charging station recommendation system according to an embodiment of the present invention improves an optimal charging station recommendation algorithm.
Figure 3:
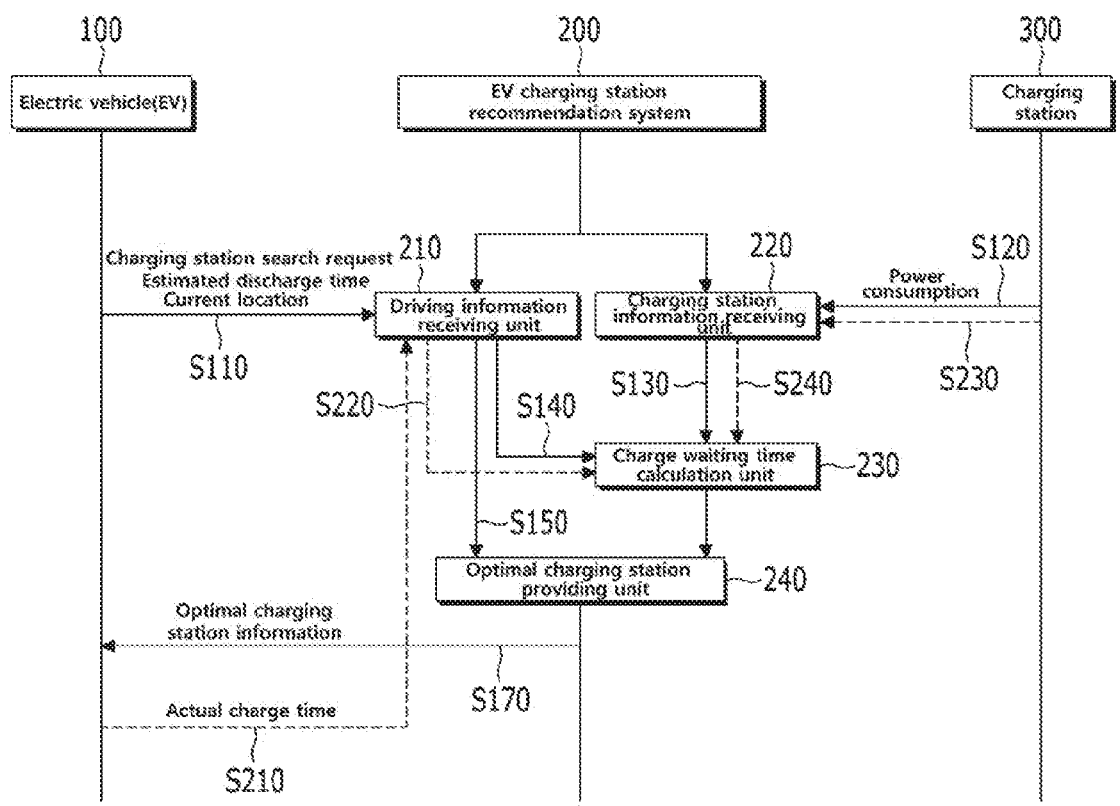
FIG. 3 is a flowchart of a method of recommending an electric vehicle charging station according to an embodiment of the present invention.

FIG. 1 is a schematic view showing a configuration in which an EV charging station recommendation system according to an embodiment of the present invention recommends an optimal charging station. FIG. 2 is a schematic view showing a configuration in which an EV charging station recommendation system according to an embodiment of the present invention improves an optimal charging station recommendation algorithm. FIG. 3 is a flowchart of a method of recommending an electric vehicle charging station according to an embodiment of the present invention.

The EV charging station recommendation system according to an embodiment of the present invention is connected to an electric vehicle 100 through a wireless network, and is also connected to charging stations 300 via wired/wireless networks.

The electric vehicle 100 is a vehicle that operates by electricity stored in a battery, and generally includes an in-vehicle infotainment (IVI) system that can collect and transmit vehicle driving information. The infotainment system calculates the estimated discharge time of the battery by using driving information, such as the current battery power level and the average speed of the electric vehicle 100 running on the road, and then transmits the information of the estimated discharge time to an EV charging station recommendation system 200, together with other information about the vehicle's current position, battery capacity, vehicle model, etc. The infotainment system may include a 3G modem or an LTE module, which allows for communication with the EV charging station recommendation system 200 at a remote location. The infotainment system may be connected to the driver's mobile device(s) and may be implemented through the driver's mobile device(s). In addition, the estimated discharge time may be calculated using the estimated discharge time indication function, a built-in feature of the vehicle.

The infotainment system can visually display the estimated discharge time or sound an alarm to notify the driver. The infotainment system acquires information about the current location using a built-in GPS. The driver can make a request to search charging stations to the infotainment system, e.g., on its touch interface (touchscreen).

Although the information of the estimated discharge time and the current location may be transmitted to the EV charging station recommendation system 200 in real time, it is preferable that such information be transmitted together when the infotainment system transmits a charging station search request to the EV charging station recommendation system 200 in response to the driver's search request. By making a charging station search request through the infotainment system, the driver can request the EV charging station recommendation system 200 for information on charging stations at close locations that are predicted to have relatively short charge waiting time.

Each charging station 300 has one or more charging stalls 310. A power meter (not shown) is also installed in the charging station 300 to measure its power consumption in real time. Here, the power consumption means electric energy consumption per unit time. The power meter transmits the power consumption data to the EV charging station recommendation system 200 in real time via wired/wireless networks, including the Internet. The power meter may be a meter for measuring the power consumption of the entire charging station, or alternatively a meter for measuring the amount of electric energy consumed by individual charging stalls 310.

The EV charging station recommendation system 200 provides the driver of the electric vehicle 100 with the information of a charging station that can be reached before the estimated discharge time and can recharge the vehicle in the shortest time based on the current position of the vehicle 100 (hereinafter, referred to as "optimal charging station"). The EV charging station recommendation system 200 is comprised of a driving information receiving unit 210, a charging station information receiving unit 220, a charge waiting time calculation unit 230 and an optimal charging station providing unit 240.

The driving information receiving unit 210 receives the charging station search request and the information of the estimated discharge time and the current location, transmitted from the electric vehicle 100 (S110). Also, the driving information receiving unit 210 may receive other information, such as, the battery capacity and vehicle model, etc., from the electric vehicle 100.

The charging station information receiving unit 220 receives the power consumption data from the charging stations 300 through the wired/wireless networks in real time (S120). Preferably, the charging station information receiving unit 220 receives the power consumption data every second. The power consumption may be "charging station power consumption," which refers to electric energy consumed in one charging station 300, or alternatively, "charging stall power consumption," which refers to electric energy consumed by each of the charging stalls in the charging station.

The charge waiting time calculation unit 230 receives the power consumption data of the charging stations 300 from the charging station information receiving unit 220 in real time (S130). If the driving information receiving unit 210 transmits a charging station search request, transmitted from the electric vehicle 100, to the charge waiting time calculation unit 230 (S140), the charge waiting time calculation unit 230 calculates the charge waiting time of the charging stations 300 on the basis of their power consumption. The charge waiting time calculation unit 230 includes a big data storage unit (not shown), and performs storage, processing, and retrieval of big data.

In order to calculate the charge waiting time, a charge waiting time database is stored in advance in the charge waiting time calculation unit 230, and basic estimated charging time corresponding to each value of the power consumption of one charging stall is stored in the charge waiting time database.

The charge waiting time database can be created in various manners on the basis of any given criteria. For example, in the case of an electric vehicle having the capacity of a medium-sized vehicle battery, the charge waiting time database can be created by measuring the variation of charge time according to the power consumption levels of a charging stall on the basis of the time to charge the battery to two-thirds of its maximum charge level. The basic estimated charge time in the charge waiting time database may exhibit relatively large errors at the beginning of its use, depending on the specific criteria for the creation of the database. However, as described later in more detail, by storing the data of actual charge time in a big data storage unit and performing analysis and conversion of the data by utilizing a deep learning algorithm, the accuracy of the charge waiting time calculation may be improved, and as a result, the level of the errors will gradually decrease, whereby more useful information from the accumulated data can be provided to the driver.

Deep learning is a branch of machine learning based on a set of algorithms that attempt to model high level abstractions (a task that summarizes key content or functions in large amounts of data or complex data) in data by using a deep graph with multiple processing layers, composed of multiple linear and non-linear transformations. Various known machine learning algorithms can be applied to the analysis of big data.

In the event that the power consumption data received from a charging station 300 is the aforementioned charging station power consumption, the basic estimated charge time corresponding to the value of the power consumption divided by the number of charging stalls in the charging station 300 is retrieved from the charge waiting time database, and that is used as the charge waiting time at the charging station 300.

Meanwhile, in the event that the power consumption data received from the charging station 300 is the aforementioned charging stall power consumption, the basic estimated charge time corresponding to the charging stall power consumption is retrieved from the charge waiting time database, and that is used as the charge waiting time.

In the event that some of the charging stalls 310 at the charging station 300 are not in use, the charge waiting time can be calculated as zero. By way of an example, the charge waiting time calculation unit 230 calculates the value of the maximum power consumption of the charging station 300 divided by the number of the charging stalls 310 held in the charging station 300 (hereinafter, referred to as "the maximum charging stall power consumption"). Here, the quotient of the current power consumption of the charging station 300 divided by the maximum charging stall power consumption is subtracted from the total number of the charging stalls 310 in the charging station 300, and the result of this operation is determined as the number of unused charging stalls. If the number of unused charging stalls is greater than 1, the charge waiting time can be calculated as zero.

Also, in the event that the power consumption data transmitted from the charging station information receiving unit 220 to the charge waiting time calculating unit 230 is the aforementioned charging stall power consumption, and some of the charging stalls 310 of the charging stations 300 are not being used, in order to differentiate the charge waiting time among the relevant charging stations 300, the charge waiting time calculation unit 230 may calculate the charge waiting time of a charging station, in which the number of charging stalls with zero power consumption (C) is more than one, as −C.

The above-described method of calculating the charge waiting time is provided by way of an example. It should be noted that the above-described method is not the only way to calculate the charge waiting time, and various other methods can be used.

The optimal charging station providing unit 240 receives the information of the estimated discharge time and the current position of the electric vehicle 100 from the driving information receiving unit 210 (S150), and receives the estimated charge waiting time of the charging stations 300 from the charge waiting time calculation unit 230 (S160). The optimal charging station providing unit 240 then provides information about optimal charging stations that can be reached within the predicted discharge time based on the current location of the electric vehicle 100 and can recharge the vehicle in the shortest time. The number of the optimal charging stations can be two or more.

An exemplary method for determining an optimal charging station is as follows. The optimal charging station providing unit 240 selects the nearby charging stations from the current position of the electric vehicle 100 that can be reached within the expected discharge time of the battery. The nearby distance may be the shortest travel distance on the map, the shortest travel time that considers traffic conditions, or the route that requires the minimum power consumption of the battery.

Then, an optimal charging station is determined among the selected nearby charging stations. The charge waiting time of each of the selected nearby charging station is calculated by the charge waiting time calculation unit 230, and the selected charging stations are sorted from shortest to longest in their charge waiting time. Then, the one having the shortest waiting time is determined as the optimal charging station.

Alternatively, after the charge waiting time of each of the nearby charging stations is calculated by the charge waiting time calculation unit 230, and the nearby charging stations are sorted from shortest to longest in their charge waiting time, a predetermined number of charging stations having the shortest charge waiting time are selected so that the driver can pick one of those charging stations on his or her own.

The optimal charging station providing unit 240 transmits the selected optimal charging station(s) to the infotainment system of the electric vehicle 100 (S170), and the infotainment system displays the information of the optimal charging station(s) on the screen in the vehicle so that the driver can check it.

Another exemplary method for determining the optimal charging station is as follows. The optimal charging station providing unit 240 selects the nearby charging stations from the current position of the electric vehicle 100 that can be reached within the expected discharge time. The nearby distance may be the shortest travel distance on the map, the shortest travel time that considers traffic conditions, or the route that requires the minimum power consumption of the battery.

Then, an optimal charging station is selected among the selected nearby charging stations. Minimum charge time for each of the selected nearby charging stations is calculated. The minimum charge time is the sum of travel time to the respective charging station and the charge waiting time at that charging station. The travel time to the nearby charging stations may be the shortest travel time or the most economical travel time which can be set depending on the driver's preference.

Based on the minimum charge time calculated by the charge waiting time calculation unit 230, the selected nearby charging stations are sorted from shortest to longest in their minimum charge time, and the one having the shortest minimum charge time is determined as the optimal charging station.

Alternatively, after the selected nearby charging stations are sorted from shortest to longest in their minimum charge time calculated by the charge waiting time calculation unit 230, a predetermined number of nearby charging stations having the shortest minimum charge time are selected so that the driver can pick one of those charging stations on his or her own.

The optimal charging station providing unit 240 transmits the selected optimal charging station(s) to the infotainment system of the electric vehicle 100, and the infotainment system displays the information of the optimal charging station(s) on the screen in the vehicle so that the driver can check it.

The above-described method of determining the optimal charging station(s) is only one example. Thus, the optimal charging station is not determined only by the above method, and various other methods can be applied.

The electric vehicle 100 can move to an optimal charging station 300 recommended by the EV charging station recommendation system 200 according to an embodiment of the present invention, and be recharged at the charging station 300.

The electric vehicle 100 transmits the actual charge time t1 to charge the battery at the optimal charging station 300, together with other information including the battery capacity and vehicle model, etc., to the driving information receiving unit 210 through the infotainment system (S210). The travel information receiving unit 210 transmits the actual charge time t1 to the charge waiting time calculation unit 230 (S220). At the same time, the power meter (not shown) of the optimal charging station 300 transmits the power consumption data during the actual charge time t1 (hereinafter, referred to as "actual power consumption") to the charging station information receiving unit 220 in real time (S230).

The charging station information receiving unit 220 transmits the actual power consumption data to the charge waiting time calculation unit 230 (S240). The charge waiting time calculation unit 230 stores the actual power consumption data, the actual charge time t1 and the vehicle information in a big data storage unit, and reflects the stored big data of the actual power consumption and actual charge time t1 so as to improve the calculation accuracy of the charge waiting time.

As the simplest example for convenience of explanation, the charge waiting time calculation unit 230 calculates the average of the actual power consumption during the actual charge time t1. Here, if the actual power consumption is the actual power consumption of the optimal charging station 300, the calculated average is divided by the number of the charging stations 310 of the optimal charging station 300. If the actual power consumption amount is the actual power consumption of a charging stall in the optimal charging station 300, the calculated average is used as it is.

The charge waiting time calculation unit 230 looks up the basic estimated charge time t0 corresponding to the average actual power consumption in the charge waiting time database, and adds it to the actual charge time t1 and calculates the average thereof to generate a new estimated charge time tn (hereinafter, referred to as "updated estimated charge time"). The new estimated charge time tn replaces the basic estimated charge time t0, and is used for the calculation of the charge waiting time thereafter.

If the time required for a second electric vehicle to charge the battery at the optimal charging station 300 is actual charging time t2, and the average actual power consumption of the second electric vehicle is equal to the average actual power consumption of the above-described electric vehicle 100, the charge waiting time calculation unit 230 generates a new updated estimated charge time tn' to update and replace the estimated charging time tn corresponding to the average actual power consumption in the charge waiting time database, as below.

New estimated charge time $tn'$=[basic estimated charge time $t0$+actual charge time $t1$+actual charging time $t2$]/3

As the number of electric vehicles 100 that are charged in the optimal charging station 300 increases, the data of the actual power consumption and the actual charge time will accumulate. As a result, the calculation errors of the charge waiting time will gradually decrease, and accordingly, the big data-based EV charging station recommendation system according to an embodiment of the present invention provides very accurate charge waiting time.

The above-described method of updating the charge waiting time is only an example, and is not the only way to update. Thus, various other methods can be applied.

Meanwhile, the EV charging station recommendation system according to an embodiment of the present invention may also provide information on charging stations (e.g., best dates and time for charging in specific charging stations) located along the route between a departing location and a destination, based on the big data previously stored in the big data storage unit. Moreover, it is also possible to automatically recommend charging stations with short waiting time along the travel route without the driver's request.

Although specific embodiments have been illustrated and described herein, it would be appreciated by those of ordinary skill in the art that various modifications and adaptations may be made without departing from the scope of the present invention.

REFERENCE NUMERALS

100: Electric vehicle (EV)
200: EV charging station recommendation system
210: Driving information receiving unit
220: Charging station information receiving unit
230: Charge waiting time calculation unit
240: Optimal charging station providing unit
300: Charging station
310: Charging stall

What is claimed is:

1. An electric vehicle (EV) charging station recommendation system comprising:
    a driving information receiving unit for receiving a charging station search request, and information about estimated discharge time and a current location from an electric vehicle;
    a charging station information receiving unit for receiving power consumption data from charging stations in real time;
    a charge waiting time calculation unit for receiving the power consumption data from the charging station information receiving unit, and, in response to a charging station search request, calculating charge waiting time of the charging stations on the basis of their power consumption data; and
    an optimal charging station providing unit for receiving the information about the estimated discharge time and current location from the driving information receiving unit, and receiving the charge waiting time from the charge waiting time calculation unit, and providing information about at least one optimal charging station that can be reached within the estimated discharge time based on the current location and can recharge the vehicle in the shortest time,
    wherein the charge waiting time calculation unit stores in advance a set basic estimated charging time corresponding to each level of power consumption of a respective charging stall,
    wherein the power consumption data received from a charging station is the power consumption of the charging station ("charging station power consumption"),
    wherein the basic estimated charge time corresponding to the value of the charging station power consumption divided by the number of charging stalls in the charging station is used as the charge waiting time at the charging station,
    wherein the driving information receiving unit receives actual charge time from the electric vehicle recharged at the charging station, and wherein the charge waiting time calculation unit receives and stores the charging station power consumption during the actual charge time from the charging station information receiving unit, and reflects the actual power consumption and actual charge time t1 so as to improve accuracy of the charge waiting time calculation, and
    wherein the charge waiting time calculation unit calculates an average of the charging station power consumption during the actual charge time, and wherein the charge waiting time calculation unit adds the basic estimated charge time to the actual charge time and calculates the average thereof to generate a new estimated charge time ("updated estimated charge time"), thereby replacing the basic estimated charge time with the updated estimate charge time.

2. The EV charging station recommendation system according to claim 1, wherein the optimal charging station providing unit determines nearby charging stations that can be reached within the estimated discharge time, and provides information on at least one optimal charging station having the shortest charge waiting time, selected among the nearby charging stations.

3. The EV charging station recommendation system according to claim 1, wherein the optimal charging station providing unit determines nearby charging stations that can be reached within the estimated discharge time, calculates minimum charge time, which is the sum of travel time to a respective charging station and charge waiting time at said charging station, and provides information about optimal charging stations in the order from shortest to longest in the minimum charge time.

4. The EV charging station recommendation system according to claim 1, wherein the charge waiting time calculation unit calculates maximum charging stall power consumption, which is the value of the maximum power consumption of the charging station divided by the number of charging stalls held in the charging station, wherein the quotient of the power consumption of the charging station divided by the maximum charging stall power consumption is subtracted from the total number of the charging stalls of the charging station, and the result of said operation is determined as the number of unused charging stalls, and wherein if the number of the unused charging stalls is greater than 1, the charge waiting time is determined as zero.

\* \* \* \* \*